US010051203B2

(12) United States Patent
Yamamoto

(10) Patent No.: US 10,051,203 B2
(45) Date of Patent: Aug. 14, 2018

(54) COMPOSITE IMAGE CREATING APPARATUS

(71) Applicant: OLYMPUS CORPORATION, Hachioji-shi, Tokyo (JP)

(72) Inventor: Sachie Yamamoto, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 7 days.

(21) Appl. No.: 15/288,389

(22) Filed: Oct. 7, 2016

(65) Prior Publication Data
US 2017/0111592 A1    Apr. 20, 2017

(30) Foreign Application Priority Data

Oct. 20, 2015 (JP) .................... 2015-206296

(51) Int. Cl.
| | | |
|---|---|---|
| H04N 5/265 | (2006.01) | |
| H04N 5/232 | (2006.01) | |
| H04N 5/77 | (2006.01) | |
| G11B 27/00 | (2006.01) | |
| H04N 9/804 | (2006.01) | |

(52) U.S. Cl.
CPC ............ *H04N 5/265* (2013.01); *G11B 27/00* (2013.01); *H04N 5/23216* (2013.01); *H04N 5/23229* (2013.01); *H04N 5/23245* (2013.01); *H04N 5/23293* (2013.01); *H04N 5/77* (2013.01); *H04N 5/772* (2013.01); *H04N 9/8042* (2013.01)

(58) Field of Classification Search
CPC .............. H04N 5/265; H04N 5/23216; H04N 5/23229; H04N 5/23245; H04N 5/23293; H04N 5/77; H04N 5/772; H04N 9/8042; G11B 217/00

USPC .......................................... 348/239
See application file for complete search history.

(56) References Cited

U.S. PATENT DOCUMENTS

| | | | |
|---|---|---|---|
| 2005/0036044 A1* | 2/2005 | Funakura | H04N 5/23232 348/239 |
| 2013/0088592 A1* | 4/2013 | Falomkin | G06K 9/78 348/143 |
| 2013/0162853 A1* | 6/2013 | Kim | H04N 5/23293 348/220.1 |
| 2014/0192147 A1* | 7/2014 | Mack | H04N 5/265 348/42 |
| 2016/0110612 A1* | 4/2016 | Sabripour | G06K 9/00765 382/103 |
| 2016/0301872 A1* | 10/2016 | Kameda | H04N 5/23293 |

FOREIGN PATENT DOCUMENTS

JP    2012-070162 A    4/2012

* cited by examiner

*Primary Examiner* — Nhan T Tran
(74) *Attorney, Agent, or Firm* — Volpe & Koenig, P.C.

(57) ABSTRACT

A composite image creating apparatus includes: an image determining unit that determines a specific subject in the first video; a boundary setting unit that sets a boundary that divides a screen of the first video into a specific range and a non-specific range, the specific range including the specific subject, the non-specific range not including the specific subject; a display control unit that displays the boundary when the second video is photographed; and a combining unit that combines an image within the specific range in the first video with an image within a range in the second video that corresponds to the non-specific range so as to create a composite image.

7 Claims, 15 Drawing Sheets

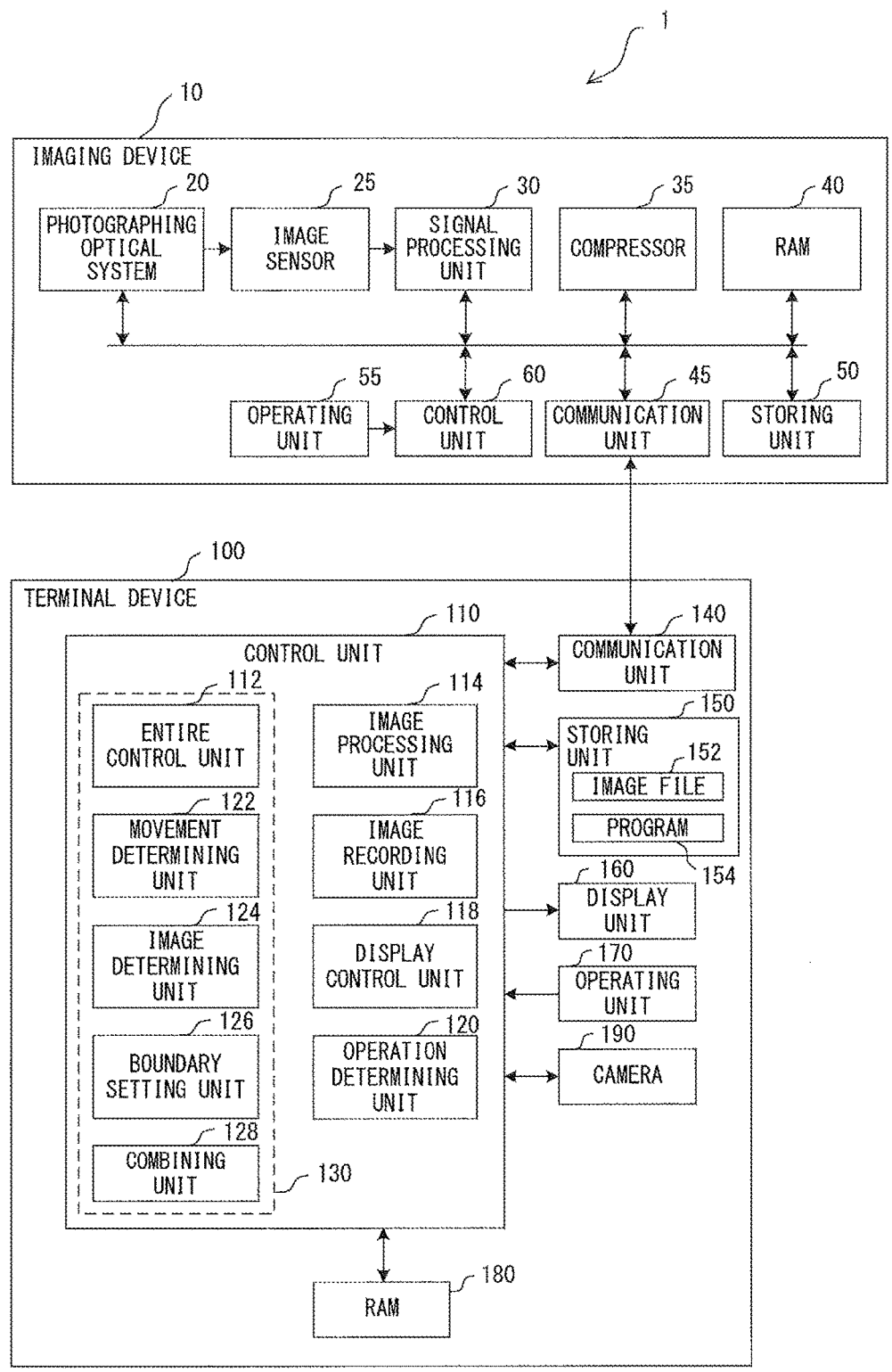
F I G. 1

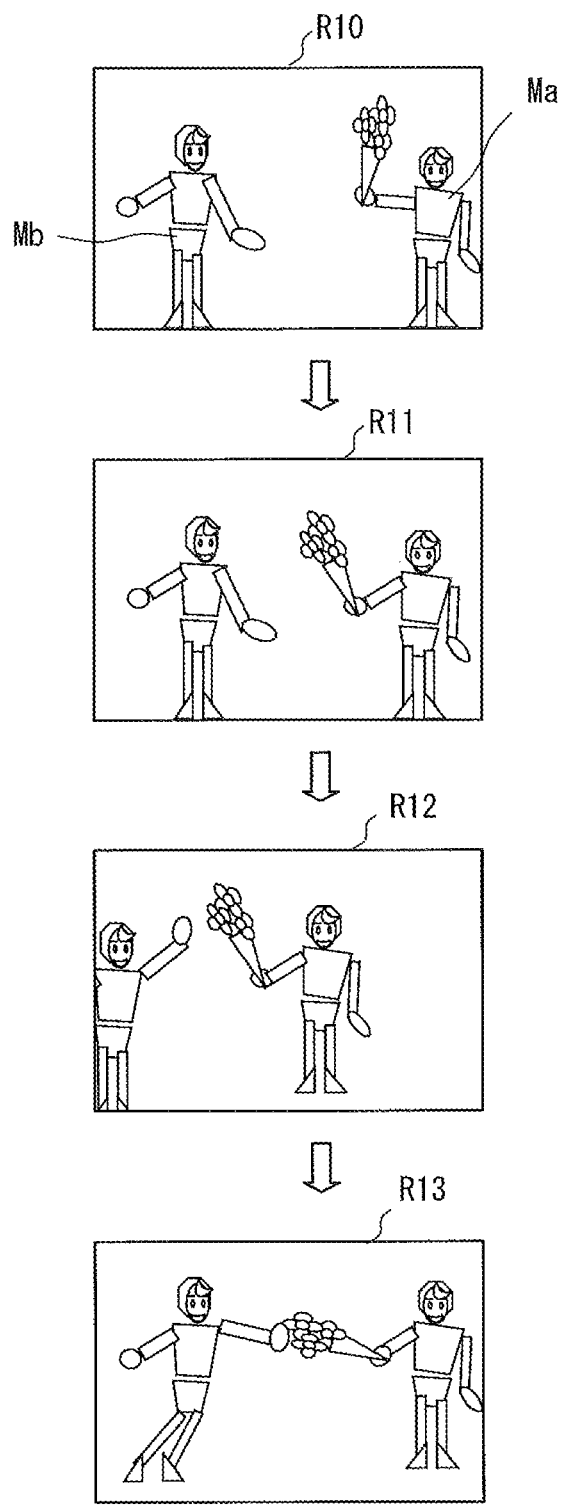
F I G. 7

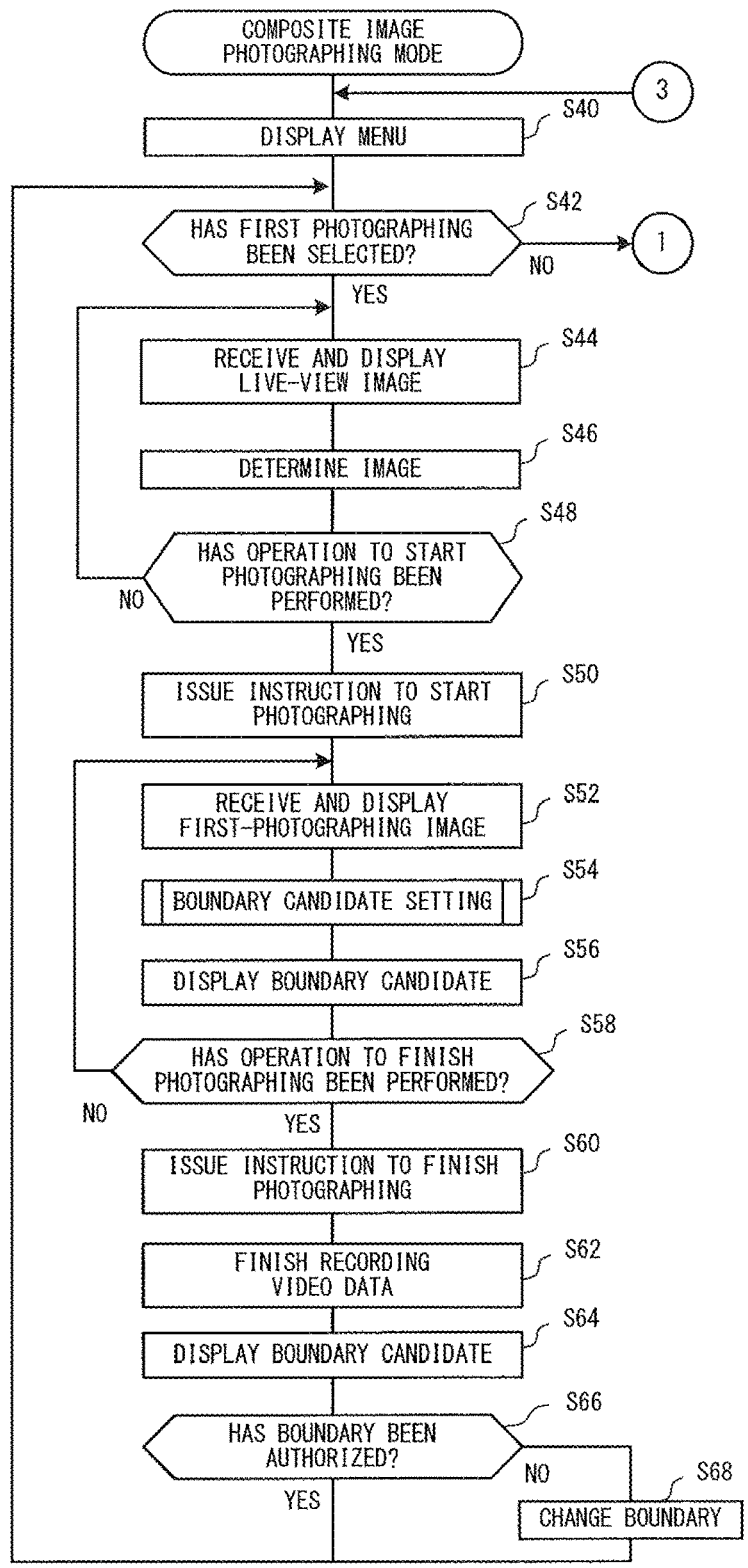
F I G. 9

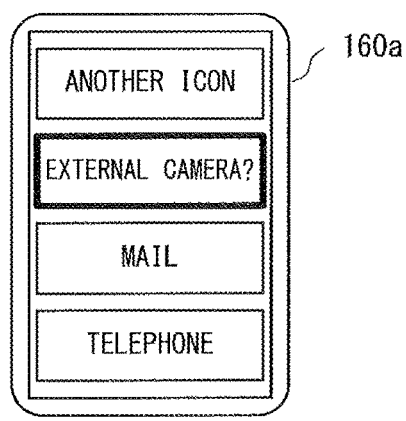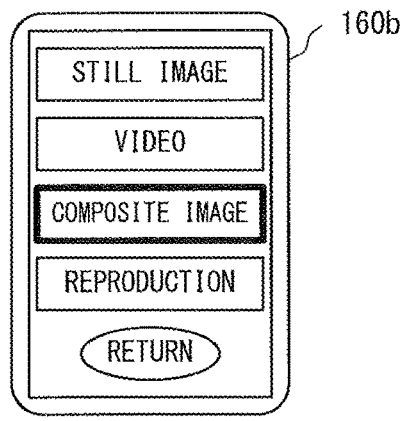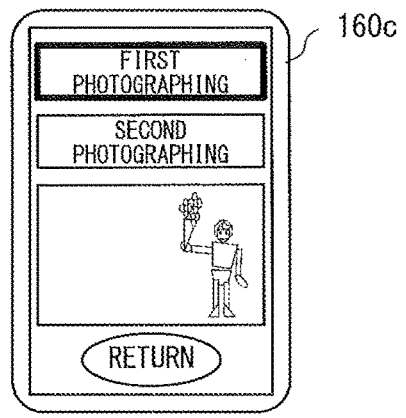
F I G. 13

COMPOSITE IMAGE CREATING APPARATUS

CROSS-REFERENCE TO RELATED APPLICATIONS

This application is based upon and claims the benefit of priority of the prior Japanese Patent Application No. 2015-206296, filed on Oct. 20, 2015, the entire contents of which are incorporated herein by reference.

BACKGROUND OF THE INVENTION

Field of the Invention

The present invention relates to a technology for photographing images for image composition.

Description of the Related Art

A video processing technology and a video processing apparatus have been advanced, and composition of a video with a video has become common. Various types of imaging devices that can easily perform a setting operation of image composition have been proposed. As an example, an imaging device has been proposed that sets the position and size of an image for composition, such as a comment, that will be added to a video and that combines the image for composition with a photographed video under a set condition (Patent Document 1).

[Patent Document 1] Japanese Laid-Open Patent Publication No. 2012-70162

SUMMARY OF THE INVENTION

According to the present invention, a composite image creating apparatus that combines a first video and a second video photographed after the first video so as to create a composite image is provided that includes: an image determining unit that determines a specific subject in the first video; a boundary setting unit that sets a boundary that divides a screen of the first video into a specific range and a non-specific range, the specific range including the specific subject, the non-specific range not including the specific subject; a display control unit that displays the boundary together with a live-view image of the second video when the second video is photographed; and a combining unit that combines an image within the specific range in the first video with an image within a range in the second video that corresponds to the non-specific range so as to create a composite image.

BRIEF DESCRIPTION OF THE DRAWINGS

FIG. 1 illustrates the entire configuration of an imaging system.

FIG. 7 illustrates a composite image created from two videos illustrated in FIG. 6.

FIG. 9 is flowchart 1 explaining the procedure of a composite image photographing process.

FIG. 13 illustrates an example of a screen of a display unit of a terminal device.

DETAILED DESCRIPTION OF THE PREFERRED EMBODIMENTS

Figure 2:
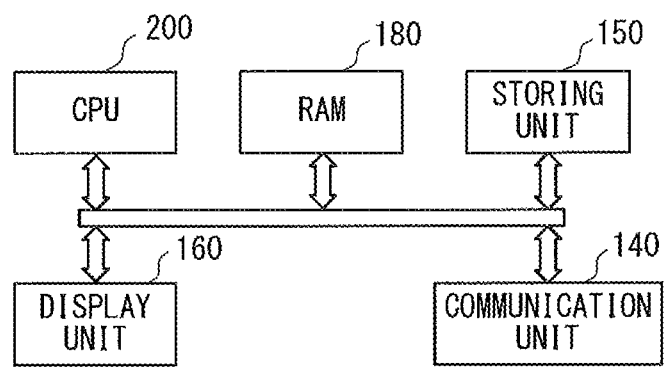
FIG. 2 is a hardware block diagram relating to a control unit.

Embodiments of the present invention are described below with reference to the drawings. FIG. 1 illustrates the entire configuration of an imaging system 1 that includes a composite image creating apparatus.

The imaging system 1 is configured of an imaging device 10 and a terminal device 100. The imaging device 10 has a photographing function for photographing an image (a video or a still image) and a communication function for transmitting the photographed image. The terminal device 100 is an information processing terminal that has a communication function, an image processing function, an image recording function, and the like. The terminal device 100 may be a personal computer (PC), or may be a tablet terminal or a portable terminal (a smartphone).

In addition, the terminal device 100 includes a composite image creating apparatus that photographs images for composition and creates a composite image from the photographed images for composition. The imaging device 10 and the terminal device 100 are connected wirelessly to each other, for example, by using Wi-Fi. Wired connection may be performed.

The imaging device 10 includes a photographing optical system 20, an image sensor 25, a signal processing unit 30, a compressor 35, a Random Access Memory (RAM) 40, a communication unit 45, a storing unit 50, an operating unit 55, and a control unit 60.

The photographing optical system 20 forms a subject image on the image sensor 25. The photographing optical system 20 includes an optical lens group, a lens driving unit for focusing and zooming, a diaphragm, a diaphragm driving unit, and the like, but these are not illustrated. The photographing optical system 20 performs automatic exposure (AE)/auto focus (AF) in accordance with an instruction from the control unit 60.

The image sensor 25 is configured of a charge coupled device (CCD) or a complementary MOS (CMOS), and the image sensor 25 performs photoelectric conversion on the subject image, and outputs an image signal. The signal processing unit 30 includes a correlated double sampling (CDS) unit that reduces noise of the image signal output from the image sensor 25, and an automatic gain control (AGC) unit that amplifies the image signal to a prescribed level.

The compressor 35 digitalizes and converts the image signal into image data, and performs a compressing process in a prescribed format such as MPEG4 or H.264. The RAM 40 is a working area that expands the image data for processing performed by the compressor 35, or a buffer memory in communication.

The communication unit 45 performs USB connection so as to directly communicate image data with an external device, or communicates the image data with the external device directly or via a network by using Wi-Fi or the like. The storing unit 50 is a non-volatile storing unit that is configured of a hard disk drive (HDD), a flash memory, or the like. In the storing unit 50, image data, a control program, and various pieces of data are stored.

The operating unit 55 is used for a photographer to input various operation instructions, and specifically, the operating unit 55 is a button or a dial (not illustrated). The operating unit 55 reports an operation instruction to the control unit 60. The control unit 60 is a control unit that integrally controls the entirety of the imaging device 10. The control unit 60 includes a central processing unit (CPU 200), and the CPU 200 that reads a control program stored in the storing unit 50 performs a control process.

A flow of transmitting image data from the imaging device 10 to the terminal device 100 is simply described. Upon receipt of an instruction to execute a photographing mode or to perform photographing from the terminal device 100 via the communication unit 45, the control unit 60 photographs, for example, a video in accordance with the instruction.

When the control unit 60 receives an instruction to photograph a composite image described later from the terminal device 100, the control unit 60 controls the photographing optical system 20 so as to set an AE/AF condition under which a difference between the first photographing and the second photographing is inconspicuous in a boundary portion.

The signal processing unit 30 outputs the subject image on which the image sensor 25 has performed photoelectric conversion as an image signal. The compressor 35 compresses the image signal in a prescribed format. The imaging device 10 transmits the compressed image data from the communication unit 45 the terminal device 100.

The terminal device 100 includes a control unit 110, a communication unit 140, a storing unit 150, a display unit 160, an operating unit 170, a random access memory (RAM) 180, and a camera 190.

The control unit 110 integrally controls the entirety of the terminal device 100. The communication unit 140 performs USB connection so as to directly communicate image data with an external device, or communicates the image data with the external device directly or via a network by using Wi-Fi or the like.

The storing unit 150 is a non-volatile storing unit that is configured of an HDD, a flash memory, or the like. In the storing unit 150, an image file 152 that is photographed image data, a program 154 for controlling, and various pieces of data are stored.

The display unit 160 is configured of an LCD, an organic EL, or the like, and the display unit 160 displays a screen displaying various instructions to the terminal device 100 (a menu screen), a photographed image, or the like. The operating unit 170 is used to input various operation instructions, and specifically, the operating unit 170 is a button or a touch panel (not illustrated).

The RAM 180 is a working area that expands image data or a control program. The camera 190 is a photographing device incorporated in the terminal device 100. The camera 190 has functions equivalent to those of the photographing optical system 20, the image sensor 25, the signal processing unit 30, and the like in the imaging device 10. An example in which videos to be combined are photographed by using the imaging device 10 is described below, but the videos to be combined may be obtained by the camera 190.

The control unit 110 includes an entire control unit 112, an image processing unit 114, an image recording unit 116, a display control unit 118, an operation determining unit 120, a movement determining unit 122, an image determining unit 124, a boundary setting unit 126, and a combining unit 128 as individual function units. A central processing unit (CPU) 200 described with reference to FIG. 2 reads the program 154 for controlling that has been stored in the storing unit 150, and performs a process according to the program 154 such that various control processes performed by the control unit 110 are implemented.

The entire control unit 112 integrates various individual processes performed by the image processing unit 114 through the combining unit 128, and controls the entirety of the terminal device 100.

The image processing unit 114 performs interpolation, color adjustment, compression, expansion, or the like on video data. The image recording unit 116 records image data transmitted from the imaging device 10 as the image file 152.

The display control unit 118 makes the display unit 160 display the image data transmitted from the imaging device 10 as a live-view image. Alternatively, the display control unit 118 makes the display unit 160 display an image that has been read from the image file 152 and has been expanded. The display control unit 118 also makes the display unit 160 display a screen displaying various instructions (a menu screen). The operation determining unit 120 determines the content of an operation that has been input from the operating unit 170, and reports the content of the operation to the entire control unit 112.

The movement determining unit 122 analyzes a video in a composite image photographing mode, and determines a moving subject. The image determining unit 124 analyzes a video in the composite image photographing mode, and determines that a subject that moves by a prescribed amount or more or a person for which the size is larger than or equal to a prescribed size is a specific subject. The image determining unit 124 does not recognize only a body of a person as a person, but also recognizes an object that is directly connected to the person as a portion of a person. The image determining unit 124 also determines whether a person exits by using a face detection function.

The image determining unit 124 determines that a person for which the height is, for example, greater than or equal to ⅓ the height of a screen is a specific subject. The image determining unit 124 also determines that a subject that moves, for example, in a vertical or horizontal direction by an amount that is greater than or equal to 1/10 the size of a screen within one second is a specific subject, even when the subject is not a person.

The boundary setting unit 126 determines a range in which the specific subject exists (hereinafter referred to as a specific range) in a video obtained in the first photographing (also referred to as a first-photographing image) in the composite image photographing mode, and sets a boundary. The boundary setting unit 126 displays the set boundary on a live-view screen displaying a video obtained in the second photographing (also referred to as a second-photographing image). A range that is not the specific range is referred to as a non-specific range.

Specifically, the boundary setting unit 126 determines the specific range and the non-specific range in a video obtained in the first photographing in the composite image photographing mode, and sets a boundary at which the specific range is separated from the non-specific range. The boundary setting unit 126 displays, on a screen, the set boundary in a live-view image that has been obtained in the second photographing in the composite image photographing mode. Hereinafter, a video obtained in the first photographing in the composite image photographing mode is also referred to as a first video, and a video obtained in the second photographing in the composite image photographing mode is also referred to as a second video.

The combining unit 128 extracts an image within the specific range from the first-photographing image, extracts an image within a range that corresponds to the non-specific range, from the second-photographing image, and combines both of the images so as to create a composite image.

The entire control unit 112, the movement determining unit 122, the image determining unit 124, the boundary setting unit 126, and the combining unit 128 are also collectively referred to as a composite image creating apparatus 130.

FIG. 2 is a hardware block diagram relating to the control unit 110. As described above, the communication unit 140, the storing unit 150 in which the program 154 has been stored, the display unit 160, and the RAM 180 are connected to the CPU 200 that configures the control unit 110 via a bus line.

Figure 3:
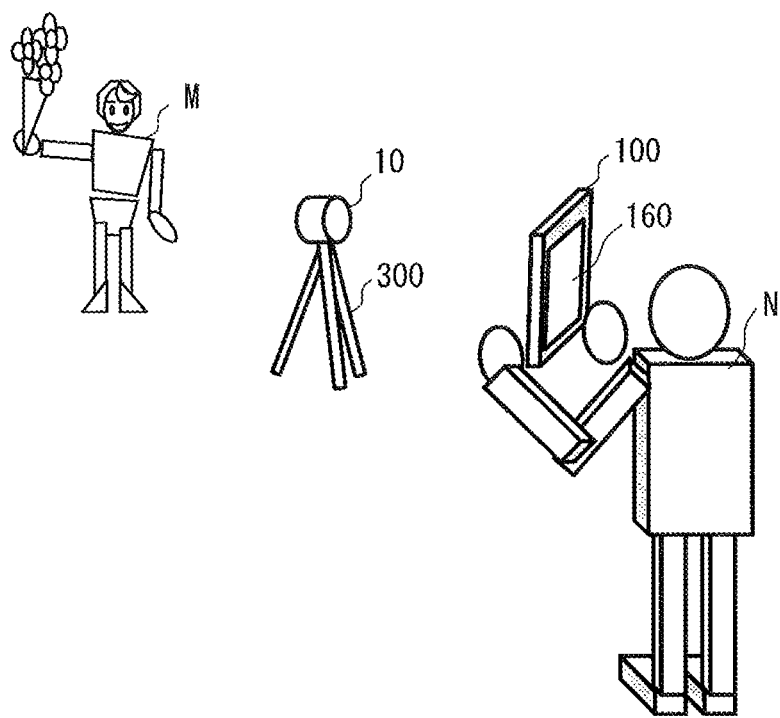
FIG. 3 illustrates an example of a scene in which a composite image is photographed.

FIG. 3 illustrates an example of a scene in which a composite image is photographed. The imaging device 10 and the terminal device 100 are connected wirelessly, for example, by using Wi-Fi. A photographer N is photographing while holding the terminal device 100 in both hands. In this example, the imaging device 10 is attached to a tripod 300 in order to eliminate deviation of a screen between videos photographed plural times. A video of a subject M photographed by using the imaging device 10 is received by the terminal device 100. The photographer N can perform monitoring by using a live-view image displayed on the display unit 160.

Figure 4:
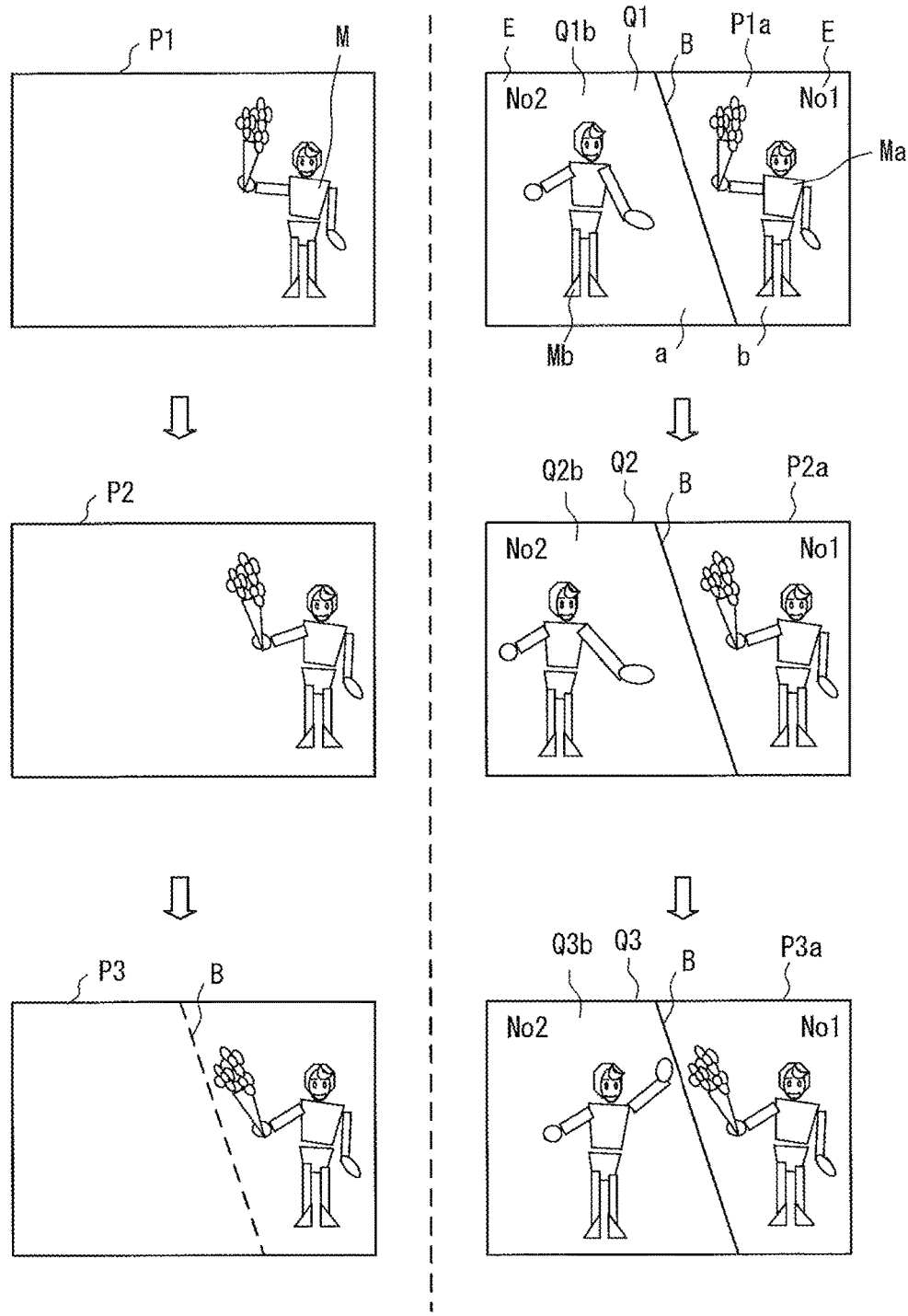
FIG. 4 illustrates live-view images in the first and second photographing in contrast with each other.
Figure 5:
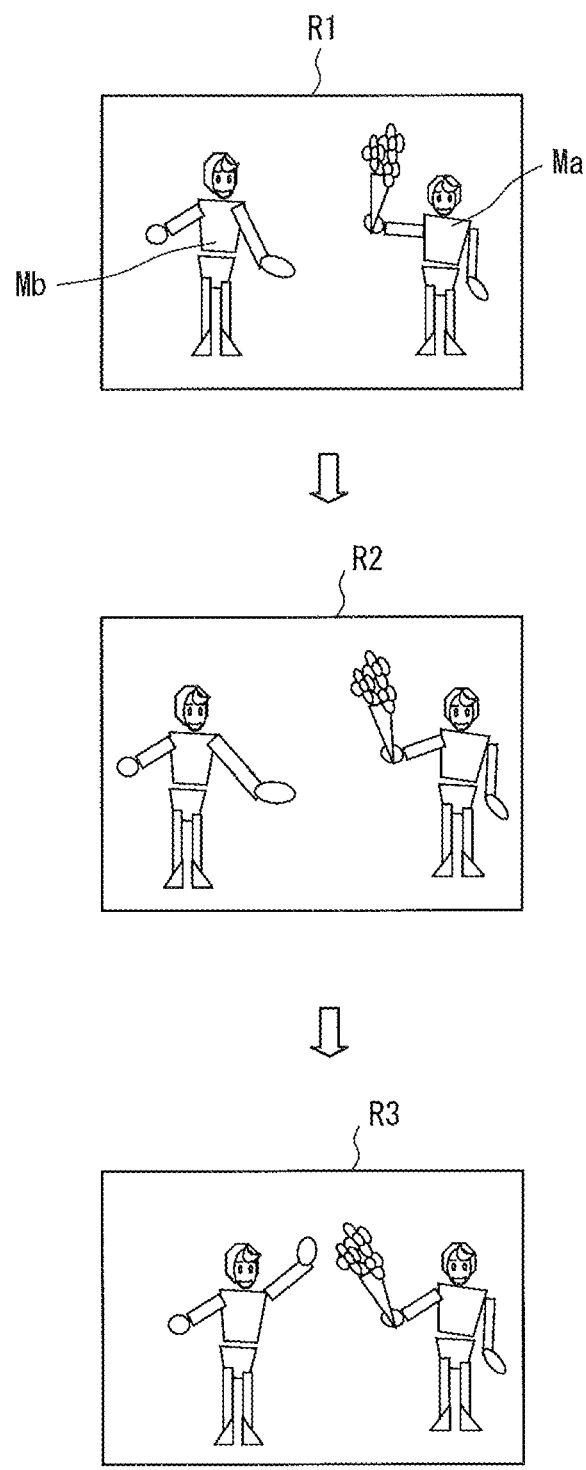
FIG. 5 illustrates a composite image created from two videos illustrated in FIG. 4.
Figure 6:
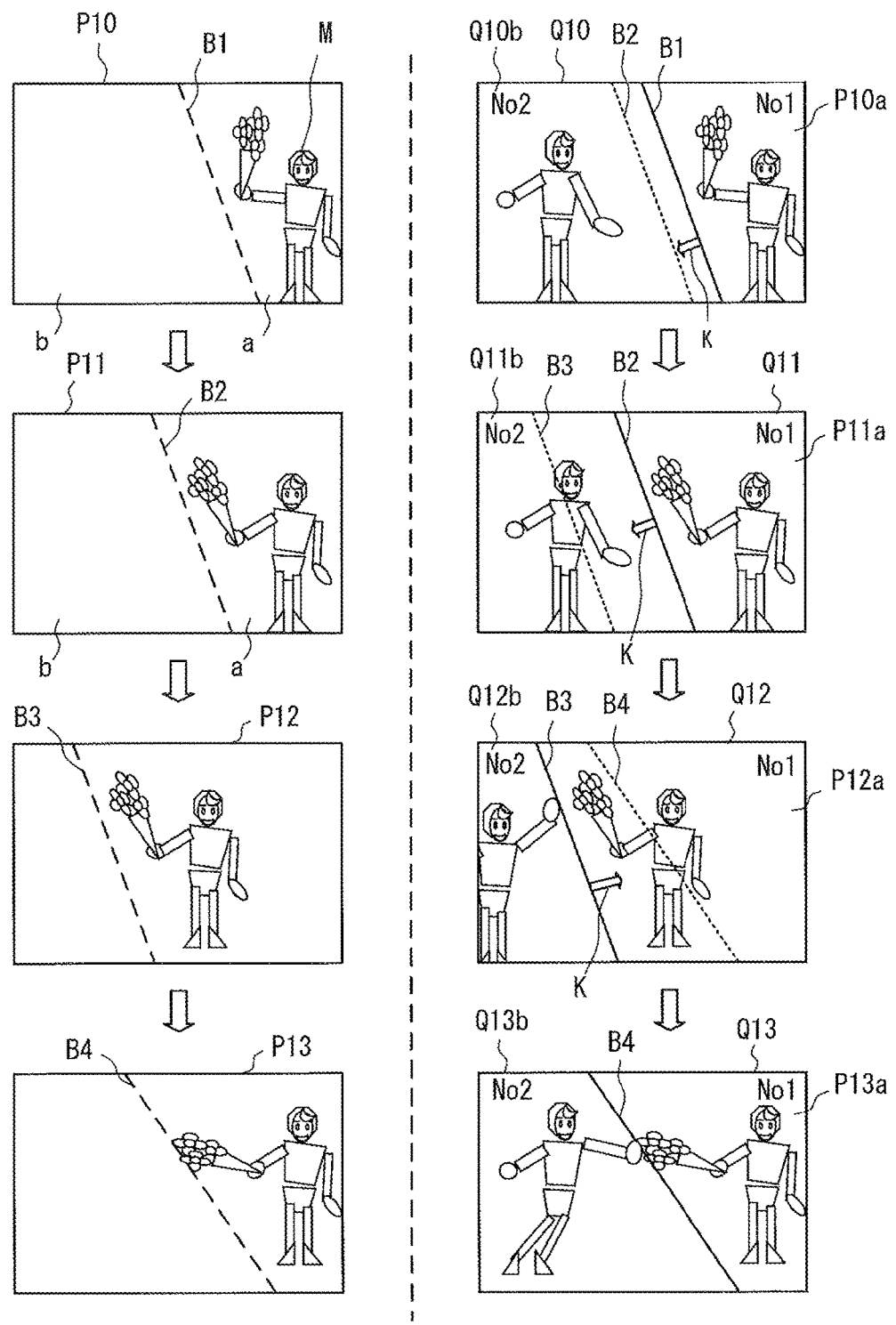
FIG. 6 illustrates live-view images in the first and second photographing in contrast with each other.

Examples of photographing of a composite image are described in detail with reference to FIGS. 4 to 7. FIGS. 4 and 5 illustrate an example in which a boundary B is fixed. FIGS. 6 and 7 illustrate an example in which the boundary B changes.

FIG. 4 illustrates live-view images in the first and second photographing that are displayed on the display unit 160 at the time of photographing a composite image, in contrast with each other.

In FIG. 4, a left-hand column illustrates a live-view image of a video P in the first photographing, and a right-hand column illustrates a live-view image of a video Q in the second photographing. The live-view image in the first photographing proceeds in the order of image P1, image P2, and image P3. Image P1 is an image at the time of commencement of photographing. Image P2 is an image two seconds after commencement of photographing. Image P3 is an image at the time when photographing is finished (for example, five seconds after commencement).

In the first photographing, it is assumed that the subject M moves so as to offer a bouquet held in the right hand in a leftward direction as viewed from the front. In the first photographing, the image determining unit 124 determines that the subject M is a specific subject. The boundary setting unit 126 analyzes the movement of the subject M that is a specific subject, and sets a boundary B. In image P3 at the time when photographing is finished, the set boundary B is indicated with a broken line. Video data of the first photographing and data of the set boundary B are stored in the image file 152.

The live-view image in the second photographing proceeds in the order of image Q1, image Q2, and image Q3. Image Q1 is an image at the time of commencement of photographing, and corresponds to image P1. Image Q2 is an image two seconds after commencement of photographing, and corresponds to image P2. Image Q3 is an image at the time when photographing is finished (five seconds after commencement), and corresponds to image P3. Stated another way, images Q1, Q2, and Q3 are images that are being photographed, and images P1, P2, and P3 are images that have been photographed.

In the live-view image in the second photographing, a screen is divided into left-hand and right-hand portions from the boundary B. It is assumed that a portion on a right-hand side of the screen is area a, and that a portion on a left-hand side of the screen is area b. Area a is a specific range in which a subject Ma exists, and area b is a non-specific range in which the subject Ma does not exist. The video P photographed in the first photographing is displayed in area a, and the live-view image in the second photographing (the video Q) is displayed in area b. No1 and No2 are respectively displayed in areas a and b as area information E for a photographer to identify areas.

At the time when photographing is started, image P1a that corresponds to area a of image P1 in the first photographing is displayed in area a of image Q1. Image Q1b that corresponds to area b of image Q in the second photographing is displayed in area b of image Q1.

Two seconds after commencement of photographing, image P2a that corresponds to area a of image P2 in the first photographing is displayed in area a of image Q2. Image Q2b that corresponds to area b of image Q in the second photographing is displayed in area b of image Q2.

Five seconds after commencement of photographing, video P3a that corresponds to area a of image P3 in the first photographing is displayed in area a of image Q3. Video Q3b that corresponds to area b of image Q in the second photographing is displayed in area b of image Q3. The second photographing may be automatically finished at a timing at which the first photographing is finished, or may be finished according to an operation of a photographer.

FIG. 5 illustrates a composite image created from two videos illustrated in FIG. 4. A composite image is created by the combining unit 128 from an image within a specific range (area a) of a first-photographing image and an image within a non-specific range (area b) of a second-photographing image. The composite image proceeds in the order of composite image R1, composite image R2, and composite image R3. A subject Ma in the first photographing and a subject Mb in the second photographing are photographed in synchronization with each other. Consequently, a scene can be expressed in which a bouquet seems to be offered from the subject Ma to the subject Mb.

By doing this, a boundary in composite image photographing is set in a position according to the position and movement of a subject in the first photographing, and therefore a troublesome process of setting the boundary in advance can be eliminated, and a movement position of the subject, or the like in the second photographing can be set appropriately.

In addition, an image within a specific range in the first photographing is simultaneously displayed in a live-view image in the second photographing, and therefore the movement of a subject in the second photographing can be easily synchronized with the movement of the subject in the first photographing.

An example in which the boundary B changes is described with reference to FIGS. 6 and 7. FIG. 6 illustrates a live-view image of the video P in the first photographing and a live-view image of the video Q in the second photographing that are displayed in the display unit 160 at the time of photographing a composite image, in contrast with each other.

In FIG. 6, a left-hand column illustrates a live-view image in the first photographing, and a right-hand column illustrates a live-view image in the second photographing. The live-view image in the first photographing proceeds in the order of image P10, image P11, image P12, and image P13. Image P10 is an image at the time when photographing is started, and it is assumed that the images that follow are images that are photographed, for example, at intervals of two seconds. Image P13 is an image at the time when photographing is finished.

In the first photographing, it is assumed that a subject M moves so as to offer a bouquet held in the right hand in a leftward direction as viewed from the front while moving in leftward and rightward directions. The image determining unit 124 analyzes the size of the subject M, and determines that the subject M is a specific subject. The boundary setting unit 126 sets a boundary B1 according to the subject M. In image P10, the set boundary B is indicated with a broken line. It may take time for the boundary setting unit 126 to set the boundary B1, and therefore the boundary B may not be displayed immediately after photographing is started, and the boundary B may start being displayed in image P11 or another image that follows.

Then, the boundary setting unit 126 analyzes the size and movement of the subject M, and sequentially sets the boundary B. Set boundaries B2, B3, and B4 are respectively indicated with a broken line in images P11, P12, and P13. By doing this, the boundary moves in the order of B1, B2, B3, and B4.

The live-view image in the second photographing proceeds in the order of image Q10, image Q11, image Q12, and image Q13.

Similarly to the example of FIG. 4, in the live-view image in the second photographing, a screen is divided into left-hand and right-hand portions from the boundary B. It is assumed that a divided portion on a right-hand side of the boundary B in the screen is area a, and that a portion on a left-hand side in the screen is area b. A video P in the first photographing is displayed in area a, and a video Q in the second photographing is displayed in area b. Similarly to FIG. 4, area information E is also displayed.

When the second photographing is started, image P10a that corresponds to area a of image P10 in the first photographing is displayed in area a of image Q10. Image Q10b that corresponds to area b of image Q in the second photographing is displayed in area b of image Q10.

In image Q10 at the time of commencement of the second photographing, a current boundary B1 is indicated with a solid line, and the subsequent boundary B2 is indicated with a broken line. Further, because the boundary B changes from the boundary B1 to the boundary B2, arrow K that announces a movement direction of the boundary B beforehand is displayed. The boundary setting unit 126 announces a boundary beforehand by indicating the subsequent boundary B with a broken line or displaying arrow K. Either the subsequent boundary or arrow K may be displayed.

In image Q11 two seconds after commencement of the second photographing, a current boundary B2 is displayed with a solid line, the subsequent boundary B3 is displayed with a broken line, and a lower-leftward arrow K is also displayed. In image Q12 four seconds after commencement of the second photographing, a current boundary B3 is displayed with a solid line, the subsequent boundary B4 is displayed with a broken line, and an upper-rightward arrow K is displayed. In image Q12 at the time when photographing is finished, only a current boundary B4 is displayed with a solid line.

FIG. 7 illustrates an example of a composite image created from two videos illustrated in FIG. 6. A composite image is created from videos in the first and second photographing by the combining unit 128. The composite image proceeds in the order of composite image R1, composite image R2, composite image R3, and composite image R4. By moving a boundary B, a composite image having a larger movement can be obtained, compared with the composite image illustrated in FIG. 5.

As described above, when the boundary B moves, the subsequent position or a movement direction of the boundary is announced beforehand on a screen, and therefore a range of the second photographing, a movement position of a subject, or the like can be set appropriately. Consequently, even when a subject largely moves in a screen in the first photographing, a composite image that does not have a contradiction can be obtained. In addition, photographing can be performed while a relationship between two subjects Ma and Mb is dynamically presented.

It is troublesome that the boundary B changes at short intervals, and therefore it is preferable that the boundary setting unit 126 set a time interval of setting a boundary to be somewhat longer (for example, about two seconds).

<Image Composite Photographing Process>

Figure 8:
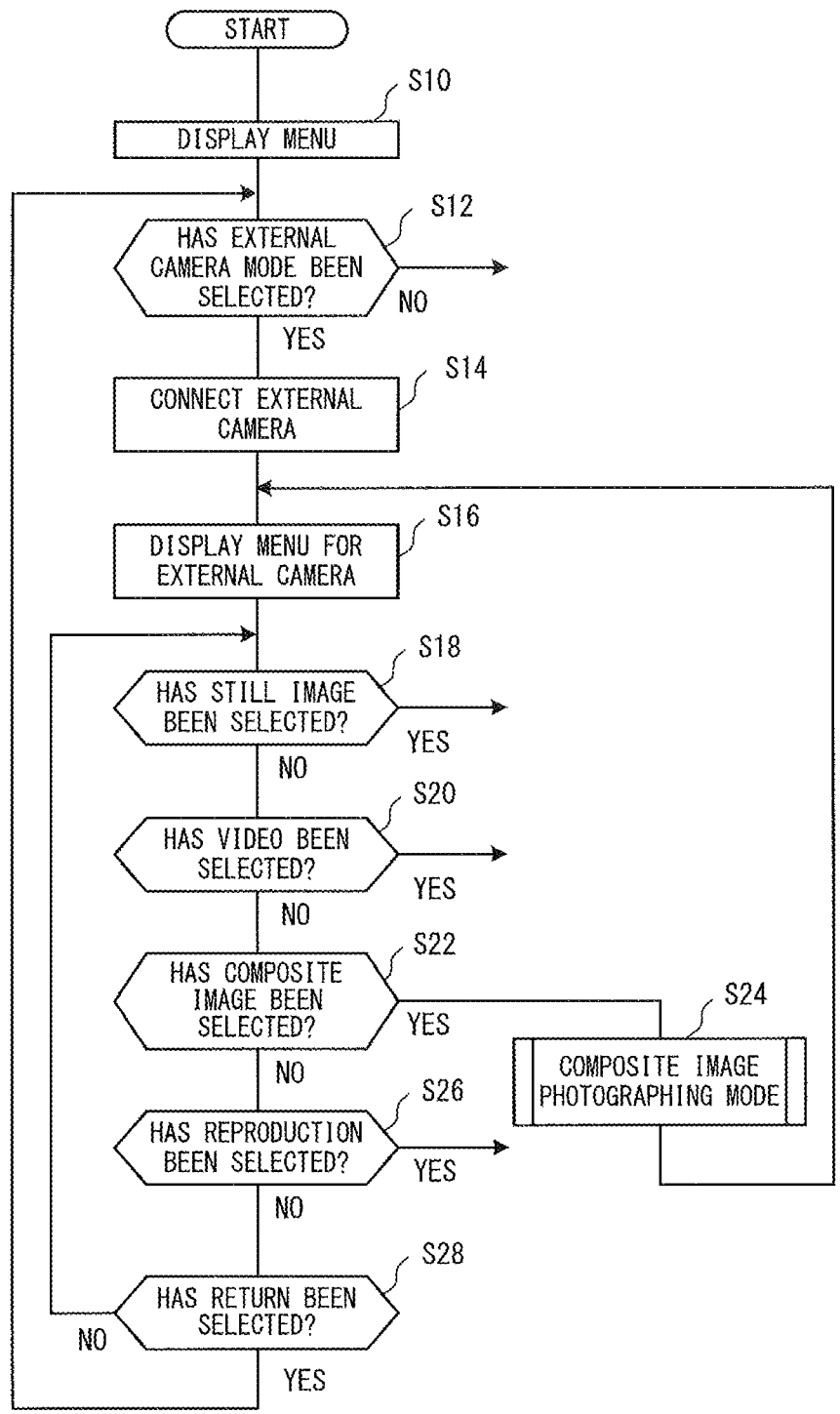
FIG. 8 is a main flowchart explaining the procedure of a photographing process performed by a terminal device.

The procedure of an image composite photographing process is described next with reference to FIGS. 8 to 15. FIG. 8 is a main flowchart explaining the procedure of a photographing process performed by a terminal device 100. A case in which an external camera (the imaging device 10) is used as a camera, as described in the example of FIG. 3 of a photographic scene, is described below, but the same basically applies to a case in which the camera 190 that has been incorporated is used.

The entire control unit 112 displays a menu on the display unit 160 (step S10). FIG. 13 illustrates an example of a screen of the display unit 160 of the terminal device 100. The entire control unit 112 displays a screen 160a or the like under the control of the display control unit 118.

The entire control unit 112 determines that an external camera mode has been selected on the displayed menu screen (the screen 160a) by a photographer (step S12). When the entire control unit 112 determines that the external camera mode has not been selected on the menu screen (step S12, NO), the entire control unit 112 executes another selected mode, but the description thereof is omitted.

It is assumed here that the external camera mode has been selected on the menu screen. When the entire control unit 112 determines that the external camera monde has been selected on the menu screen (step S12, YES), the entire control unit 112 performs a process of connection with an external camera (step S14). The entire control unit 112 detects an available imaging device 10, communicates with the detected imaging device 10, and establishes connection, via the communication unit 140.

The entire control unit 112 displays a menu for the external camera on the display unit 160 (step S16). The entire control unit 112 displays a menu such as a screen 160b of FIG. 13 under the control of the display control unit 118. The photographer selects an item on the screen 160b.

The entire control unit 112 determines whether still image photographing has been selected (step S18), whether normal video photographing has been selected (Step S20), whether composite image photographing has been selected (step S22), and whether image reproduction has been selected (step S26), on the screen 160b.

When the entire control unit 112 determines that still image photographing has been selected (step S18, YES), that normal video photographing has been selected (step S20, YES), or that image reproduction has been selected (step S26, YES), the entire control unit 112 performs a process that corresponds to the selection. Descriptions of respective processes for still image photographing, normal video photographing, and image reproduction are omitted.

When the entire control unit 112 determines that composite image photographing has been selected (step S22, YES), the entire control unit 112 executes a composite image photographing mode (step S24). The entire control unit 112 determines further determines whether "return" has been selected on the screen 160b of FIG. 13 (step S28). When the entire control unit 112 determines that "return" has been selected on the screen 160b of FIG. 13 (step S28, YES), the process returns to step S12. When the entire control unit 112 determines that none of the buttons have been selected (step S18, NO; step S20, NO; step S22, NO; step S26, NO; and step S28, NO), the process returns to step S18.

Figure 10:
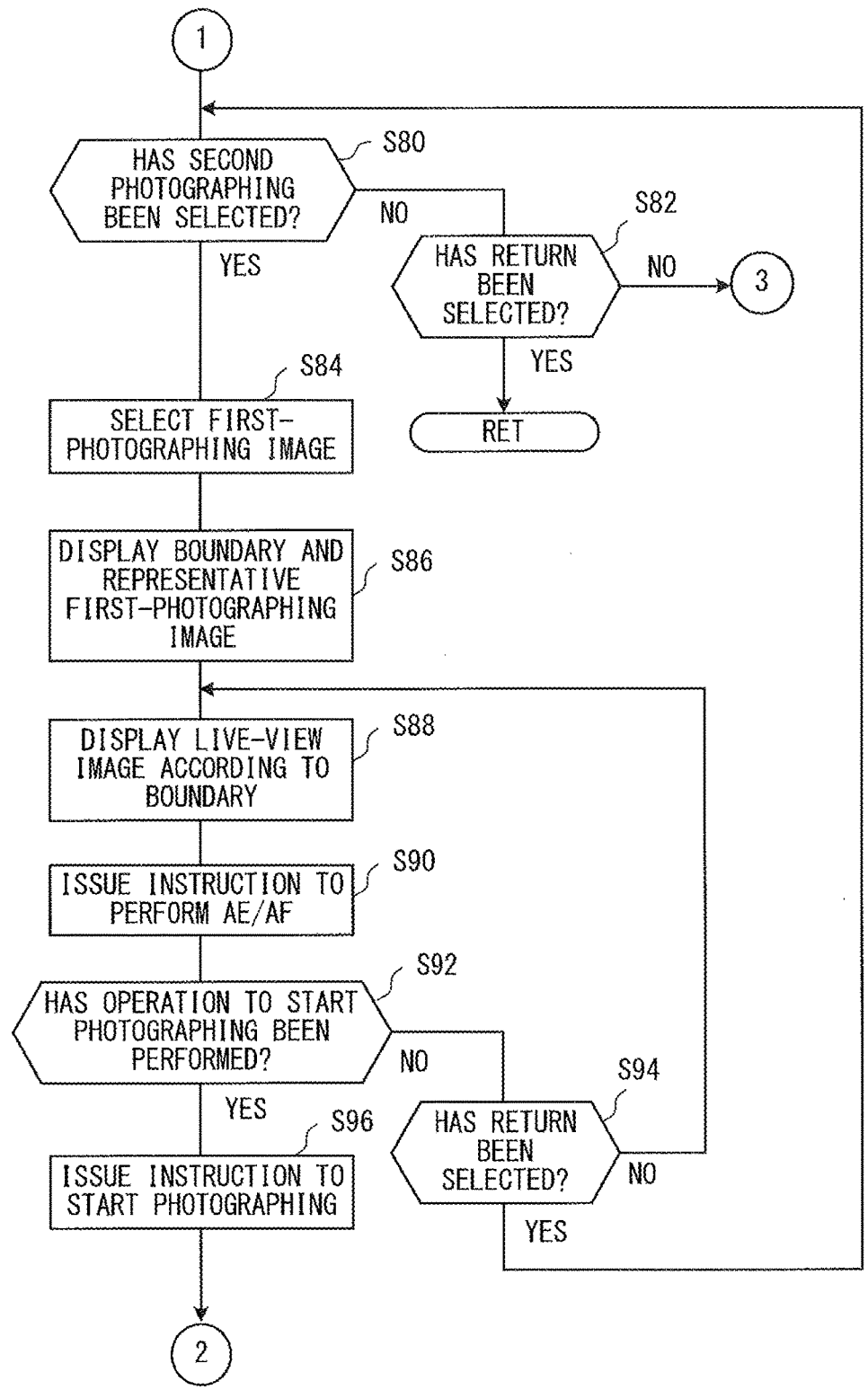
FIG. 10 is flowchart 2 explaining the procedure of a composite image photographing process.
Figure 11:
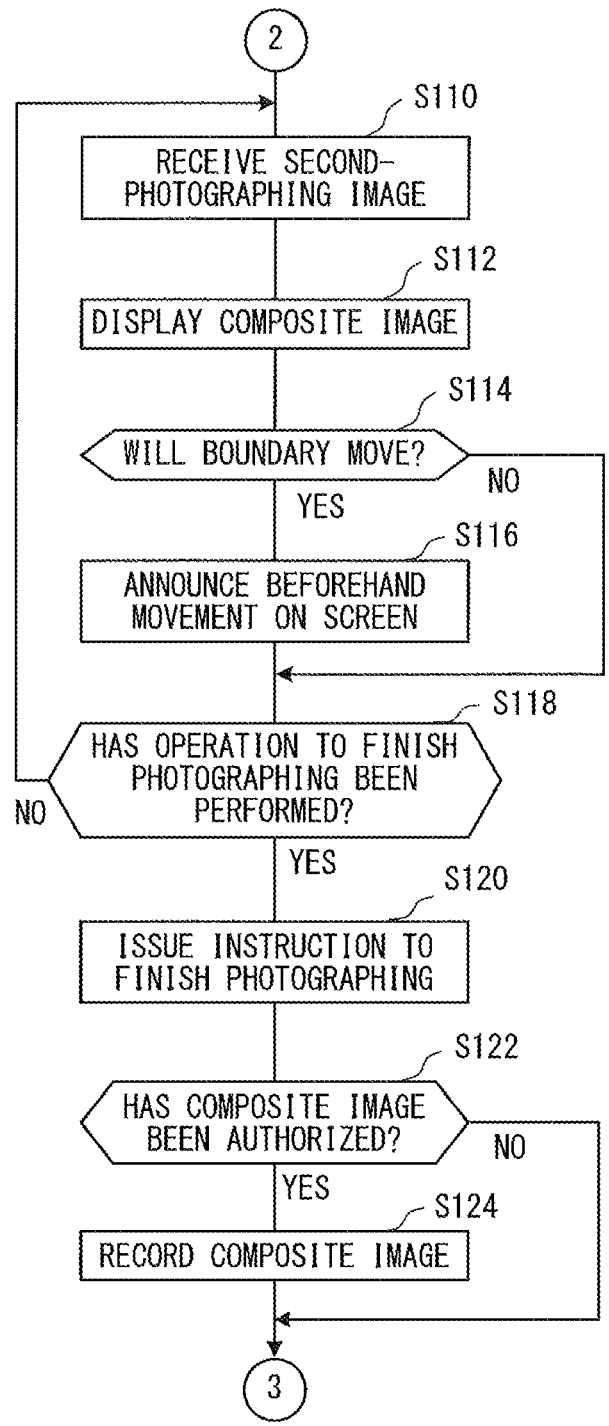
FIG. 11 is flowchart 3 explaining the procedure of a composite image photographing process.

The composite image photographing mode is described below. FIGS. 9 to 11 are flowcharts 1, 2, and 3 explaining the procedure of a composite image photographing process in the composite image photographing mode. The image composite photographing process is principally performed by the entire control unit 112, the movement determining unit 122, the image determining unit 124, the boundary setting unit 126, and the combining unit 128 of the terminal device 100.

The entire control unit 112 displays a menu on the display unit 160 (step S40). The entire control unit 112 displays a menu such as a screen 160c of FIG. 13 under the control of the display control unit 118.

The entire control unit 112 determines whether the first photographing has been selected by a photographer (step S42). When "first photographing" is tapped on the screen 160c of FIG. 13, the first photographing is selected. When the entire control unit 112 determines that the first photographing has been selected (step S42, YES), the entire control unit 112 performs the first photographing.

The entire control unit 112 issues, to the imaging device 10, an instruction to perform the first photographing to photograph a composite image and an instruction to transmit a live-view image. In addition, the entire control unit 112 transmits a required photographing condition (a photographing mode, image quality, or the like) to the imaging device 10.

The entire control unit 112 receives a live-view image photographed by the imaging device 10, and displays the received live-view image on the display unit 160 (step S44). The movement determining unit 122 and the image determining unit 124 perform image determination on the basis of the received live-view image (step S46). Specifically, the movement determining unit 122 analyzes the live-view image, and determines a moving subject. The image determining unit 124 analyzes the live-view image, and determines that a subject that moves by a prescribed amount or more or a subject for which the size is larger than or equal to a prescribed size is a specific subject. Here, the boundary setting unit 126 may determine a boundary, and may display the determined boundary on the display unit 160.

The entire control unit 112 makes the operation determining unit 120 determine whether an operation to start photographing has been performed by the photographer (step S48). When a prescribed button in the terminal device 100 is operated, the entire control unit 112 determines that an operation has been started. When the entire control unit 112 determines that the operation to start photographing has not been performed (step S48, NO), the process returns to step S44.

When the entire control unit 112 determines that the operation to start photographing has been performed (step S48, YES), the entire control unit 112 issues an instruction to start photographing to the imaging device 10 (step S50). Upon receipt of the instruction to start photographing from the terminal device 100, the imaging device 10 sets a photographing condition such as AE/AF, and starts the first video photographing. The imaging device 10 sequentially transmits photographed videos to the terminal device 100.

The entire control unit 112 receives a first-photographing video that has been photographed by the imaging device 10, and displays the received first-photographing image as a live-view image on the display unit 160 (step S52). The image recording unit 116 starts recording video data in the image file 152. The movement determining unit 122, the image determining unit 124, and the boundary setting unit 126 perform boundary candidate setting on the basis of the received video (step S54).

Figure 12:
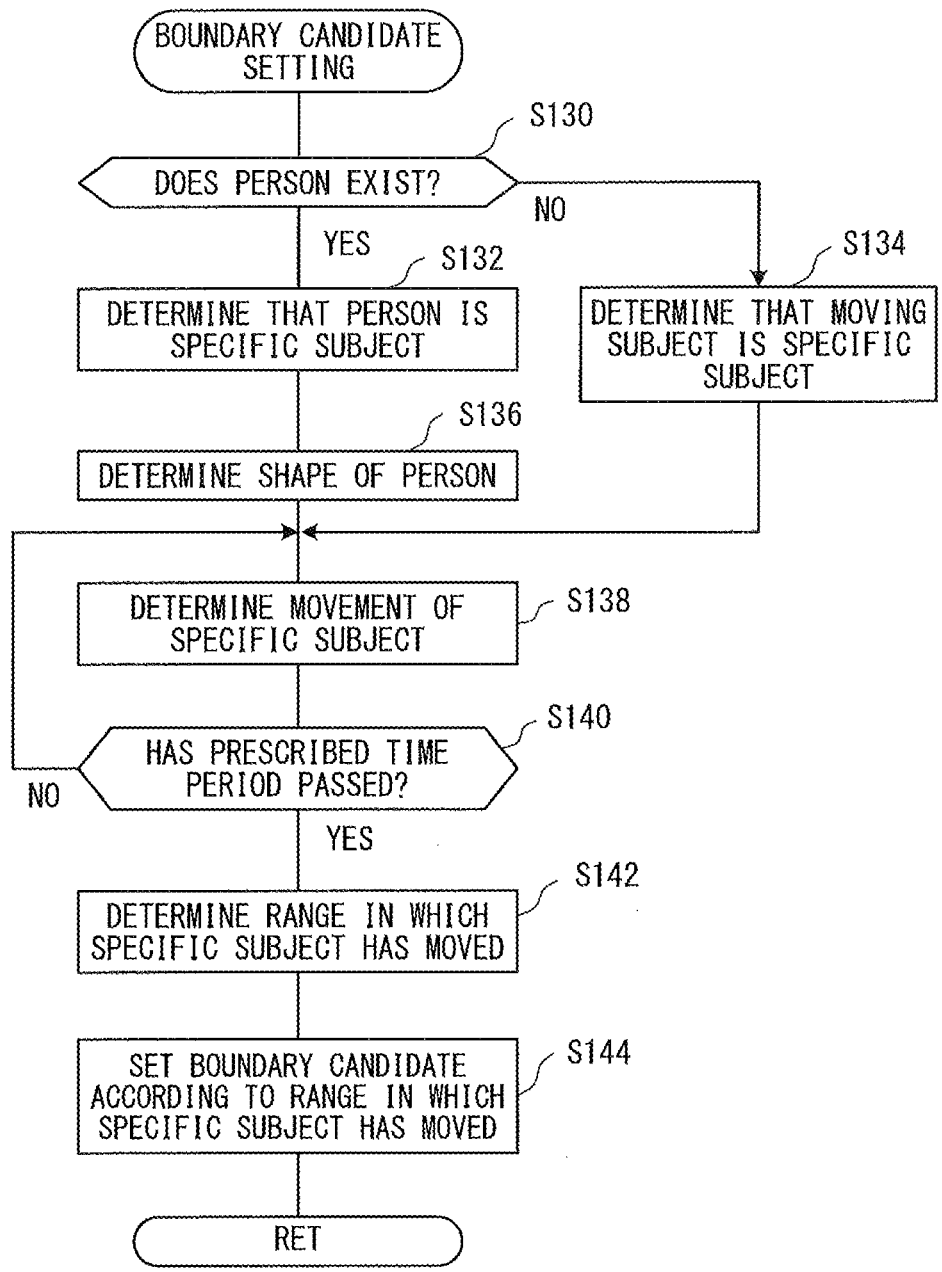
FIG. 12 is a subroutine explaining the procedure of boundary candidate setting.

FIG. 12 is a subroutine explaining the procedure of boundary candidate setting. The image determining unit 124 determines whether a person exists in a video (step S130). When the image determining unit 124 determines that a person for which the size is larger than or equal to a prescribed size exists in a video (step S130, YES), the image determining unit 124 determines that the person is a specific subject (step S132). As described above, the image determining unit 124 determines whether a person exits by using, for example, a face detection function for performing analysis according to a degree of similarity or the like by using a feature of an image pattern. As an example, when the height of a person is greater than or equal to ⅓ the height of a screen, the image determining unit 124 determines that the person is a specific subject.

In addition, the image determining unit 124 determines the shape of the person (step S136). The image determining unit 124 does not regard only a body of the person as a person, but also regards an object that is directly connected to the person as a portion of a person. It is assumed that the image determining unit 124 also performs the determination above of whether an object is connected to a person by analyzing the pattern of an image. Similarly to face detection, determination can be performed according to the shapes, positions, arrangement, or the like of respective portions of a human body by comparing the pattern of a shadow or color of an obtained image with an image pattern dictionary relating to various postures of a human body, such as a human body posture pattern database, or the like. Determination may be performed by using a feature of a movement by referencing a movement peculiar to a portion (such as bending or revolving around a joint). In addition, determination may be performed considering the speed of a movement, or the like.

When the movement of a hand is detected, if the movement has a feature as an image of a hand, whether the movement has been caused by bending of joints is determined. Where a trunk exists can be determined by tracing the joints, and which position in an obtained screen a person exists in can be determined by considering determination of a face located in a corresponding position. In recent years, a technology for detecting a distance distribution of an image has become popular, and such a technology may be simultaneously used. Namely, the image determining unit 124 detects a portion that moves by a prescribed amount or more in the first video, and determines according to the pattern or movement of an image and a feature of a distance distribution that a subject relating to the portion is a specific subject (for example, a person).

When the image determining unit 124 determines that no person exists in a video (step S130, NO), the image determining unit 124 determines that a moving subject is a specific subject (step S134). The movement determining unit 122 determines the movement of the subject. The image determining unit 124 targets at an object that largely moves, and therefore, as an example, if there is a subject that moves in a vertical or horizontal direction by an amount that is greater than or equal to 1/10 the size of a screen within one second, the image determining unit 124 determines that the subject is a specific subject.

The movement determining unit 122 further determines the movement of the specific subject (step S138). The movement determining unit 122 determines whether a prescribed time period has passed (step S140). The movement determining unit 122 performs the determination above in order to determine a range in which the specific subject has moved at prescribed time intervals (for example, two-second intervals). The movement determining unit 122 determines a range in which the specific subject has moved (step S142). When the movement determining unit 122 determines that a prescribed time period has not passed (step S140, NO), the process returns to S138. When the movement determining unit 122 determines that a prescribed time period has passed (step S140, YES), the process moves on to S142.

Figure 14:
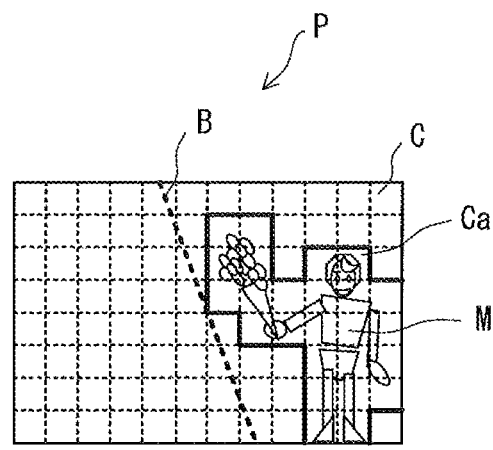
FIG. 14 is a diagram explaining an example of a boundary setting process.

The boundary setting unit 126 sets a boundary candidate according to the range in which the specific subject has moved (step S144). FIG. 14 is a diagram explaining an example of a boundary setting process. The screen illustrated in FIG. 14 is the same screen as image P2 of FIG. 4. In step S136, it is assumed that the image determining unit 124 determines that a person (a subject M) and a flower held by the person are a specific subject.

The boundary setting unit 126 segments a screen into blocks C each having a prescribed size, and determines blocks Ca including the specific subject M from among the respective blocks C. The boundary setting unit 126 specifies an area surrounded with a bold line that is formed of the blocks Ca to be an area of the specific subject, and sets a boundary candidate indicated with a broken line in accordance with the position and shape of the area of the specific subject. In the example of FIG. 14, a boundary candidate is set according to the shape of the area of the specific subject so as to be a straight line that extends in an lower-rightward direction. The process moves on to step S56 of FIG. 9.

The entire control unit 112 displays the set boundary candidate on the display unit 160 so as to be superimposed onto a live-view image (step S56). As illustrated in FIG. 4, a boundary candidate may be displayed after photographing is finished without displaying the boundary candidate during the first photographing. Whether a boundary candidate is displayed or not displayed during the first photographing may be selected in initial setting.

The entire control unit 112 determines whether an operation to finish photographing has been performed by the photographer (step S58). When the entire control unit 112 determines that the operation to finish photographing has not been performed (step S58, NO), the process returns to step S52. When the entire control unit 112 determines that the operation to finish photographing has been performed (step S58, YES), the entire control unit 112 issues an instruction to finish photographing to the imaging device 10 (step S60). The image recording unit 116 closes the image file 152, and finishes recording video data in the first photographing (step S62).

The entire control unit 112 displays the set boundary candidate on the display unit 160 (step S64). When the boundary candidate is displayed, only the boundary candidate may be displayed, or a video onto which the boundary candidate has been superimposed may be reproduced and displayed. In a case in which the boundary candidate moves, as illustrated in FIG. 6, only the boundary candidates may be sequentially displayed, or respective boundary candidates and videos at the time of switching the respective boundary candidates may be sequentially displayed.

The entire control unit 112 determines whether the boundary candidate has been authorized by the photographer (step S66). The photographer observes the displayed boundary candidate, and determines whether the boundary candidate is appropriate. When the entire control unit 112 determines that the boundary candidate has been authorized (step S66, YES), the image recording unit 116 records information relating to the authorized boundary candidate as boundary information, together with photographed video data, in the image file 152.

When the entire control unit 112 determines that the boundary candidate has not been authorized (step S66, NO), the entire control unit 112 changes a boundary or deletes the boundary candidate in accordance with an instruction from the photographer. When the photographer issues an instruction to change a boundary, the boundary setting unit 126 changes a boundary according to the instruction. When the photographer issues an instruction to delete the boundary candidate, the entire control unit 112 performs the first photographing again. After the entire control unit 112 performs the process of S66 or S68, the process returns to step S42.

When the entire control unit 112 determines that the first photographing has not been selected (step S42, NO), the entire control unit 112 determines whether the second photographing has been selected (step S80). When "second photographing" is tapped on the screen 160c of FIG. 13 by the photographer, the second photographing is selected.

When the entire control unit 112 determines that the second photographing has not been selected (step S80, NO), the entire control unit 112 determines whether "return" has been selected on the screen 160c of FIG. 13 (step S82). When the entire control unit 112 determines that "return" has been selected (step S82, YES), the entire control unit 112 finishes the composite image photographing mode, and the process returns to step S16 of FIG. 8. When the entire control unit 112 determines that "return" has not been selected (step S82, NO), the process returns to step S40.

When the entire control unit 112 determines that the second photographing has been selected (step S80, YES), the entire control unit 112 makes the photographer select a first-photographing image (step S84). This is because there may be plural first-photographing images. As an example, the entire control unit 112 arranges and displays starting screens of first-photographing images on the display unit 160, and makes the photographer select a first-photographing image. When there is only one first-photographing image, the process of step S84 is omitted.

When a first-photographing image is selected, the entire control unit 112 displays a representative image of the selected first-photographing image and a boundary in the representative image (step S86). The representative image may be a starting image or an ending image. The entire control unit 112 displays a live-view image in the second photographing according to a boundary B (step S88).

The entire control unit 112 issues, to the imaging device 10, an instruction to perform AE/AF in such a way that a boundary portion is inconspicuous (step S90). Specifically, the control unit 60 of the imaging device 10 performs control, for example, such that a diaphragm, a shutter value, a focal length, or the like is not different between the first photographing and the second photographing.

The entire control unit 112 determines whether an operation to start the second photographing has been performed (step S92). When the entire control unit 112 determines that the operation to start the second photographing has not been performed (step S92, NO), the entire control unit 112 determines whether "return" has been selected on the screen 160c of FIG. 13 (step S94). When the entire control unit 112 determines that "return" has been selected (step S94, YES), the process returns to step S80. When the entire control unit 112 determines that "return" has not been selected (step S94, NO), the process returns to step S88.

When the entire control unit 112 determines that the operation to start the second photographing has been performed (step S92, YES), the entire control unit 112 starts the second photographing. The entire control unit 112 issues, to the imaging device 10, an instruction to start the second photographing and transmit a second-photographing image (step S96). The entire control unit 112 receives the second-photographing image photographed by the imaging device 10 (step S110).

The combining unit 128 reads the first-photographing image recorded in the image file 152, and extracts an image within a specific range from the read first-photographing image. The combining unit 128 extracts an image within a range that corresponds to a non-specific range of the first-photographing image from second-photographing image. The combining unit 128 combines the two extracted images so as to create a composite image. As described above, the specific range is a range in which a specific subject exists in a first-photographing image, and the non-specific range is a range in which the specific subject does not exist in the first-photographing image.

Figure 15:
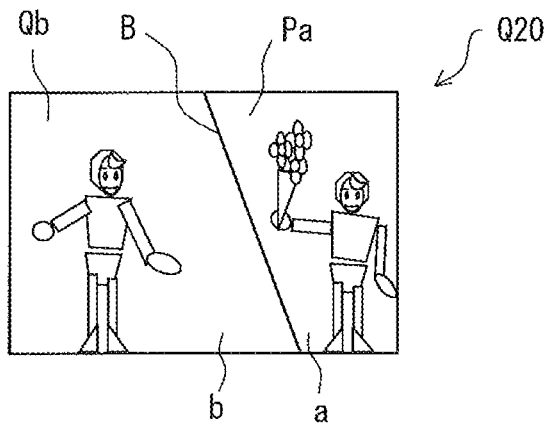
FIG. 15 illustrates an example of a live-view image displayed in the second photographing.
Figure 15:
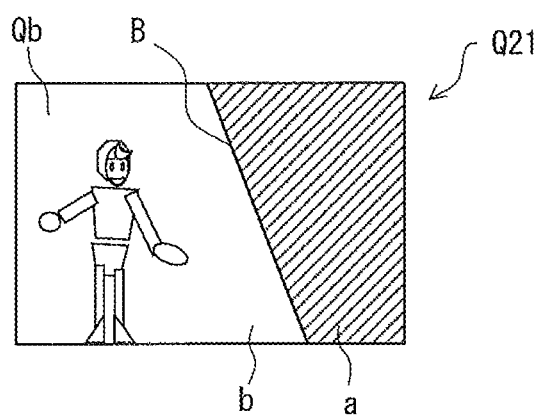
Figure 15:
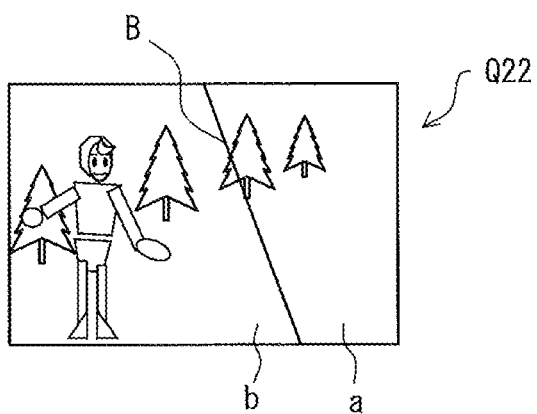

The entire control unit 112 displays the created composite image on the display unit 160 (step S112). The image recording unit 116 records the created composite image in the image file 152. When a live-view image in the second photographing is displayed, an image that is not the composite image described with reference to FIG. 5 or the like can be displayed. FIG. 15 illustrates an example of a live-view image displayed in the second photographing.

Image Q20 illustrated in an upper portion of FIG. 15 is the composite image described with reference to FIG. 5 or the like. A screen displaying a live-view image is divided into area a that is a specific area and area b that is a non-specific area from a boundary B. Pa that is a portion that corresponds to area a in a first-photographing image is displayed in area a, and Qb that is a portion that corresponds to area b in a second-photographing image is displayed in area b.

Image Q21 illustrated in the center of FIG. 15 indicates an example in which area a in the live-view image is displayed in black, blue, or the like. In this example, a process for extracting and displaying a portion of a first-photographing image can be eliminated, and a load on the combining unit 128 of a process for displaying a live-view image can be reduced.

Image Q22 illustrated in a lower portion of FIG. 15 indicates an example in which only a boundary B is displayed so as to be superimposed onto a live-view image and in which areas a and b of a second-photographing image are displayed with no change. Only a process for superimposing the boundary B is performed, and therefore a load of a process for displaying a live-view image can be further reduced, compared with the example indicated by image Q21.

Returning now to FIG. 11, the boundary setting unit 126 determines whether a boundary will move after a prescribed time period, in accordance with the boundary information recorded in the image file 152 (step S114). When the boundary setting unit 126 determines that a boundary will move after a prescribed time period (step S114, YES), the boundary setting unit 126 displays a movement announcement on a screen (Step S116). The movement announcement is an example described with reference to FIG. 6. When the boundary setting unit 126 determines that a boundary will not move after a prescribed time period (step S114, NO), the process of step S116 is skipped, and the process moves on to step S118.

The entire control unit 112 determines whether an operation to finish the second photographing has been performed by the photographer (step S118). When the entire control unit 112 determines that the operation to finish the second photographing has not been performed (step S118, NO), the process returns to step S110.

When the entire control unit 112 determines that the operation to finish the second photographing has been performed (step S118, YES), the entire control unit 112 issues an instruction to finish photographing to the imaging device 10 (step S120). The entire control unit 112 may perform control to match a time period of the second photographing with a time period of the first photographing, or may perform control to finish the second photographing after the same time period as that of the first photographing has passed.

The entire control unit 112 displays the created composite image again, and inquires of the photographer about whether the composite image will be stored and recorded. The entire control unit 112 determines whether the photographer has issued an instruction indicating that recording has been authorized (step S122).

When the entire control unit 112 determines that the instruction indicating that recording has been authorized has not been issued (step S122, NO), the entire control unit 112 erases the recorded composite image from the image file 152, and the process returns to step S40. When the entire control unit 112 determines that the instruction indicating that recording has been authorized has been issued (step S122, YES), the image recording unit 116 closes the image file 152, and finishes recording the composite image (step S124). After the process of step S124 is performed, the entire control unit 112 performs the process of step S40 again.

Conventionally, a scheme has been proposed for specifying in advance a boundary between two images in the center of a screen, performing the first photographing and the second photographing in respective areas of the two images, and creating a composite image. However, in this scheme, photographing is easily performed, but the created composite image is excessively simple, and is not interesting. In addition, this scheme cannot be adapted to a scene in which a subject largely moves within a screen.

Accordingly, if photographing can be performed while a subject in the first photographing and a subject in the second photographing are freely combined, even a beginner can easily enjoy photographing a composite image. However, it is difficult to accurately specify a position of a subject in the second photographing in accordance with the movement of the subject in the first photographing. The problems above can be solved by employing the composite image creating apparatus described above. Namely, according to the invention of the present application, a composite image creating apparatus that enables a composite image to be easily photographed can be provided.

<Variations>

The variations below can be made to the embodiments above.

The boundary B has been indicated with a straight line, but the boundary B does not always need to be indicated with the straight line. The boundary B may have a bent shape, or may be indicated with a curved line.

An example in which two photographed images are combined has been described, but the embodiments above can be adapted to a case in which three or more photographed images are combined. As an example, in the second photographing, area b is further divided into two areas, area b1 that includes a specific subject in the second photographing and area b2 that does not include the specific subject in the second photographing. By photographing a new subject in third photographing by using area b2 as a photographing range, a three-photographing composite image can be obtained.

In the embodiments above, an example of an imaging system in which a camera device and a terminal device are configured separately from each other has been described, but an imaging system in which a camera and a terminal device are integrally configured may be employed.

An imaging device does not always need to be a normal camera, and the imaging device may be an endoscope device or a microscope device. A composite image creating apparatus is mounted onto a terminal device, but the composite image creating apparatus may be mounted onto the imaging device.

An example has been described in which the imaging device 10 compresses image data, and transmits the compressed image data to the terminal device 100. However, the image data transmitted to the terminal device 100 may be non-compressed image data.

The control unit 110 has been descried to be implemented by software processing performed by the CPU 200 that reads a control program. However, a portion or the entirety of the control unit 110 may be configured of hardware.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS

1 Imaging system
10 Imaging device
20 Photographing optical system
25 Image sensor
30 Signal processing unit
35 Compressor
40 RAM
45 Communication unit
50 Storing unit
55 Operating unit
60 Control unit
100 Terminal device
110 Control unit
112 Entire control unit
114 Image processing unit
116 Image recording unit
118 Display control unit
120 Operation determining unit
122 Movement determining unit
124 Image determining unit
126 Boundary setting unit
128 Combining unit
130 Composite image creating apparatus
140 Communication unit
150 Storing unit
152 Image file
154 Program
160 Display unit
170 Operating unit
180 RAM
190 Camera
200 CPU

What is claimed is:

1. A composite image creating apparatus that combines a first video and a second video photographed after the first video so as to create a composite image, the composite image creating apparatus comprising:
a control unit including a central processing unit executing a control program, comprising:
an image determining unit that determines a specific subject in the first video;
a boundary setting unit that sets a boundary that divides a screen of the first video into a specific range and a non-specific range, the specific range including the specific subject, the non-specific range not including the specific subject;
a display control unit that displays the boundary together with a live-view image of the second video when the second video is photographed; and
a combining unit that combines an image within the specific range in the first video with an image within a range in the second video that corresponds to the non-specific range so as to create a composite image, wherein
the boundary setting unit moves a position of the boundary according to a change in the specific subject, and
the display control unit announces beforehand the position of the boundary to be moved in a case in which the set boundary is displayed in the live-view image of the second video.

2. The composite image creating apparatus according to claim 1, wherein
the display control unit displays the created composite image.

3. The composite image creating apparatus according to claim 1, wherein
the image determining unit detects a portion that moves by a prescribed amount or more in the first video, and determines that a subject that corresponds to the portion is the specific subject.

4. The composite image creating apparatus according to claim 1, wherein
the image determining unit determines that a person and an object that is in contact with the person in the first video are the specific subject.

5. The composite image creating apparatus according to claim 1, wherein
the boundary setting unit sets one boundary in accordance with the change in the specific subject in the first video.

6. The composite image creating apparatus according to claim 1, comprising:
when the second video is photographed, an imaging control unit comprising a central processing unit executing a control program issues an instruction to finish photographing in accordance with a time period during which the first video is photographed is included in an imaging device that photographs the second video.

7. A composite image creating method for combining a first video and a second video photographed after the first video so as to create a composite image, the composite image creating method comprising:
detecting a specific subject in the first video;
setting a boundary that divides a screen of the first video into a specific range and a non-specific range, the specific range including the specific subject, the non-specific range not including the specific subject;
displaying the set boundary on the screen when the second video is photographed; and
combining an image within the specific range in the first video with an image within a range in the second video that corresponds to the non-specific range so as to create a composite image, wherein
the setting the boundary moves a position of the boundary according to a change in the specific subject, and
the displaying the set boundary on the screen announces beforehand the position of the boundary to be moved in a case in which the set boundary is displayed in the live-view image of the second video.

* * * * *